United States Patent
Trainor

(10) Patent No.: US 7,053,812 B2
(45) Date of Patent: May 30, 2006

(54) RECOVERABLE POD FOR SELF-PROTECTION OF AIRCRAFT AND METHOD OF PROTECTING AN AIRCRAFT USING A RECOVERABLE POD

(75) Inventor: Daniel W. Trainor, Reading, MA (US)

(73) Assignee: Textron Systems Corporation, Wilmington, MA (US)

( * ) Notice: Subject to any disclaimer, the term of this patent is extended or adjusted under 35 U.S.C. 154(b) by 271 days.

(21) Appl. No.: 10/739,866

(22) Filed: Dec. 18, 2003

(65) Prior Publication Data

US 2005/0134496 A1    Jun. 23, 2005

(51) Int. Cl.
   *H04K 3/00*    (2006.01)
(52) U.S. Cl. .................. 342/14; 342/5; 342/7; 342/9; 342/13; 89/1.11
(58) Field of Classification Search .............. 342/1–20, 342/175, 195; 244/3.1–3.3; 89/1.11; 102/335, 102/347–352, 354
   See application file for complete search history.

(56) References Cited

U.S. PATENT DOCUMENTS

| | | | | |
|---|---|---|---|---|
| 3,792,477 A * | 2/1974 | Tomiyasu | .................... | 342/13 |
| 3,836,968 A * | 9/1974 | Schillreff | ...................... | 342/12 |
| 4,134,115 A * | 1/1979 | Strom | ........................... | 342/12 |
| 4,149,166 A * | 4/1979 | Null | ............................ | 342/13 |
| 4,357,611 A * | 11/1982 | Skomal | ........................... | 342/9 |
| 4,823,139 A * | 4/1989 | Eisner et al. | .................. | 342/15 |
| 5,249,527 A * | 10/1993 | Schwind | ...................... | 102/354 |
| 5,398,032 A * | 3/1995 | Tucker et al. | .................. | 342/9 |
| 5,786,786 A * | 7/1998 | Small | ............................ | 342/13 |
| 6,616,097 B1 | 9/2003 | Hilbert | | |
| 6,683,555 B1 * | 1/2004 | Carlson et al. | ................ | 342/14 |
| 6,833,804 B1 * | 12/2004 | Atar | ............................ | 342/10 |

FOREIGN PATENT DOCUMENTS

GB    1017377    12/1964

OTHER PUBLICATIONS

Douglas, Barry G., "Countermeasures Alternative,"—Letter to Editor—Aviation Week & Space Technology, Sep. 29, 2003, www.AviationNow.com/awst.

* cited by examiner

Primary Examiner—Bernarr E. Gregory
(74) Attorney, Agent, or Firm—Mills & Onello LLP

(57) ABSTRACT

In a countermeasure system for an aircraft, a countermeasure module includes a chamber. Countermeasure equipment is housed in the chamber of the countermeasure module. An attachment mechanism allows for releasable attachment of the countermeasure module to an aircraft. A flight mechanism is provided on the countermeasure module for returning the countermeasure module to a location, such that when an aircraft to which the countermeasure module is attached reaches a desired airborne position, the attachment mechanism releases the countermeasure module from the aircraft, and the flight mechanism on the released countermeasure module returns the countermeasure module to the location.

28 Claims, 4 Drawing Sheets

RECOVERABLE POD FOR SELF-PROTECTION OF AIRCRAFT AND METHOD OF PROTECTING AN AIRCRAFT USING A RECOVERABLE POD

BACKGROUND OF THE INVENTION

Aircraft are vulnerable to attack, particularly during takeoff and landing. In particular, aircraft flying at low altitudes during takeoff and landing are vulnerable to terrorist attack by shoulder-launched missiles, such as MAN Portable Air Defense Systems, or "MANPADs". In recent times, such MANPADs have become widespread throughout the world because they are relatively inexpensive and easy to launch by unskilled personnel.

Conventional MANPAD-launched missiles include an infrared sensor that is sensitive to heat, for example the heat emitted from an aircraft engine. The missile is programmed to home in on the infrared heat signal using a steering system. Using a rotating reticle as a shutter for the sensor, the incoming heat signal is modulated, and, using the modulated signal, an on-board processor performs the calculations necessary to steer the missile to its target. Owing to its portable size, MANPAD missiles have a limited range, and a burn time of a few seconds from launch to extinguishing.

In recent years, missile guidance systems have become increasingly sophisticated, and, as a result, there are a number of different types of missiles in existence. In some embodiments, the missile is outfitted with multiple sensors that detect infrared radiation at multiple wavelengths, using reticles that are encoded at different patterns. More recently, missiles that employ a focal plane array (FPA) have been developed. Such FPA-based systems attack aircraft based on image processing, rather than heat or radar signatures, and are trained to attack vulnerable locations of the aircraft, i.e. cockpit and rudder, which are more susceptible to fatal attack than the engines.

In view of the threat, various countermeasure techniques have become popular. A missile warning system scans the region for rocket launch signals, such as the infrared or ultraviolet signature of a rocket tail. Upon the detection of a missile launch, various countermeasure systems are activated. In one example, hot flares or chaff are released from the aircraft to confuse the infrared or radar system of the launched missile. Other approaches broadcast light energy in order to confuse the missile infrared sensors. In one example, light energy emitted by non-coherent flashlamps is directed toward the missile sensors, in order to confuse them and render them ineffective ("jamming"). In Closed-Loop InfraRed CounterMeasure (CLIRCM) systems, the optical subsystem of the missile sensor is remotely interrogated to determine its optical modulation frequency. Coherent laser energy that is specifically encoded in a suitable format by the countermeasure system is then directed toward the missile sensors, thereby confusing, or jamming, the missile sensors, causing the missile to be steered off course. High-power laser energy can also be used to counterattack FPA-based systems, by disabling the focal plane array.

Owing to their extremely high cost, such countermeasure systems have enjoyed only limited use, primarily on military aircraft. The countermeasure systems are commonly integrated into the aircraft, for example, in the fuselage, wing, or nose of the aircraft, or fixed onto an outer portion of the aircraft. Depending on where the countermeasure systems are mounted to the aircraft, they can lead to an increase in drag, reducing flight performance and increasing operating costs. Also, servicing, maintenance, upgrading and testing of the systems are expensive and time consuming procedures. In addition, such procedures require grounding of each aircraft for a period of time.

SUMMARY OF THE INVENTION

The present invention is directed to a system and method that address the limitations of the conventional approaches. In particular, the present invention is directed to a system and method for outfitting aircraft with countermeasure equipment for protection against attack. The present invention accomplishes this by providing a module, or pod, containing the countermeasure system, that is mounted to the aircraft and is later jettisoned for recovery. In one example, following takeoff of the aircraft, upon reaching a safe altitude, the module is released or detached from the aircraft and is returned to a desired location, for example a maintenance facility at or near the airport. The module is preferably capable of flight, and may take the form of, for example, a self-guided or remotely-guided unmanned aerial vehicle (UAV). Upon return to the airport or launch site, the module is then serviced and made available to be mounted on another aircraft.

In this manner, the systems and methods of the present invention are amenable to use with commercial aircraft, and provide an economical solution to the above limitations associated with conventional countermeasure systems. A modular system is provided, such that the specialized countermeasure systems can be repeatedly employed by various aircraft without the need for installing specialized systems on each aircraft. In addition, because the module is released from the aircraft upon reaching a desired altitude, the module does not contribute to drag on the aircraft for the remainder of the flight, which conserves fuel.

In one aspect, the present invention is directed to a countermeasure system for an aircraft. The system comprises a countermeasure module including a chamber. Countermeasure equipment is housed in the chamber of the countermeasure module. An attachment mechanism allows for releasable attachment of the countermeasure module to an aircraft. A flight mechanism is provided on the countermeasure module for returning the countermeasure module to a location, such that when an aircraft to which the countermeasure module is attached reaches a desired airborne position, the attachment mechanism releases the countermeasure module from the aircraft, and the flight mechanism on the released countermeasure module returns the countermeasure module to the location.

The countermeasure module may be aerodynamic in shape, for example, in the shape of a pod.

The countermeasure equipment may comprise passive countermeasures, for example flare or chaff release countermeasures. The countermeasure equipment may comprise one or more countermeasure electronics, for example, flashlamp-based countermeasure electronics or laser-based countermeasure electronics. Laser-based electronics include, for example, closed-loop infrared countermeasure (CLIRCM) systems, open loop systems, and high-power laser systems.

The attachment mechanism comprises, for example, a mortise and tenon connection, one or more solenoid pins, an apparatus for magnetic locking, lugs, fly-away lugs, folding lugs, T-slot mechanisms, or any other suitable releasably lockable connection.

The flight mechanism may comprise wings that are deployed from the countermeasure module, and may include a propulsion system.

The desired airborne position comprises, for example, a desired altitude. The location comprises, for example, a ground location, such as an airport landing strip.

In another aspect, the present invention is directed to a method of protecting an aircraft from surface-to-air missiles. A countermeasure module including countermeasure equipment is mounted to an aircraft. Upon the aircraft becoming airborne and reaching a desired airborne position, the countermeasure module is released from the aircraft. The countermeasure module is then returned to a desired location.

The countermeasure equipment is configured to perform countermeasure activity against incoming surface-to-air missiles for the aircraft while the countermeasure module is mounted to the airborne aircraft.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

FIGS. 1A–1D are sequential conceptual diagrams illustrating an aircraft at takeoff with the countermeasure module, release of the countermeasure module upon reaching altitude, and the countermeasure module taking flight and returning to the airport, in accordance with the present invention.

Figure 1A:
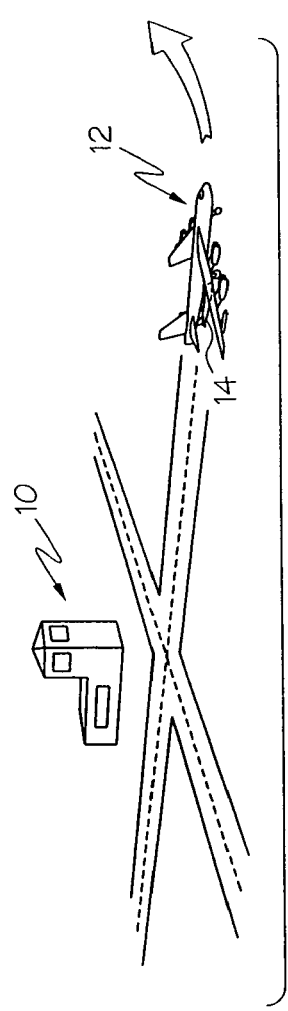
FIGS. 1A–1D are sequential conceptual diagrams illustrating an aircraft at takeoff with the countermeasure module, release of the countermeasure module upon reaching altitude, and the countermeasure module taking flight and returning to the airport, in accordance with the present invention.

In FIG. 1A, an aircraft 12, while at airport 10, is provided with a countermeasure module 14, for example in the form of a cylindrical tube, or aerodynamic pod, that is attached to the body of the aircraft 12. The countermeasure module 14 may be removably attached, for example to an underside of the fuselage, wing, nose, rudder, tail, or other portion of the aircraft. The countermeasure module 14 may optionally be placed in a cavity of the aircraft having a door that opens to allow for its eventual release of the module. Irrespective of the manner in which the countermeasure module 14 is mounted, coupled, or attached to the aircraft 12, the mounting mechanism should allow for a rigid coupling during flight with the aircraft 12, and safe release upon separation from the aircraft 12.

The countermeasure module 14 comprises, in one example, an airworthy housing that contains countermeasure equipment for jamming, confusing, disabling or damaging the sensors and/or control systems of an incoming missile, for example a MANPAD-type missile. Examples include flare and chaff-release systems, non-coherent electromagnetic energy emitting systems such as flashlamp-based systems, coherent electromagnetic energy emitting systems such as laser-based systems including closed-loop interrogation systems, CLIRCM systems, open-loop laser-based systems, high-power laser systems that disable or damage the missile sensors, and the like. Other present and future countermeasure systems may be alternatively or additionally included, and are equally applicable to the principles of the present invention.

The missile warning system which, as stated above, operates to scan the surrounding region for rocket launch signals, such as the infrared or ultraviolet signature of a rocket tail, may also be optionally placed in the countermeasure module 14. This is illustrated as component 16B of FIG. 2A. Alternatively, the missile warning system, being relatively inexpensive as compared to the countermeasure systems, may be permanently housed in the aircraft and made to interface with the countermeasure equipment in the countermeasure module 14, as illustrated as component 16A of FIG. 2A. Assuming that the missile warning system or certain components of the countermeasure equipment are permanently housed on the aircraft, the countermeasure module 14 includes releasable signal interface contacts that make contact while the module 14 is coupled to the aircraft 12 and which release when the module 14 is detached from the aircraft 12.

The countermeasure module 14 may include its own power supply for the countermeasure equipment, or may optionally receive power from the aircraft 12. Assuming power is supplied from the aircraft 12, the countermeasure module 14 includes releasable power contacts that make contact while the module 14 is coupled to the aircraft 12 and which release when the module 14 is detached from the aircraft 12. Use of aircraft power allows for the module 14 to be configured at lower cost, and lighter weight.

The countermeasure module 14 may optionally further include a global positioning system (GPS) receiver, so that a jettisoned countermeasure module has knowledge of its position and direction of flight.

Figure 1B:
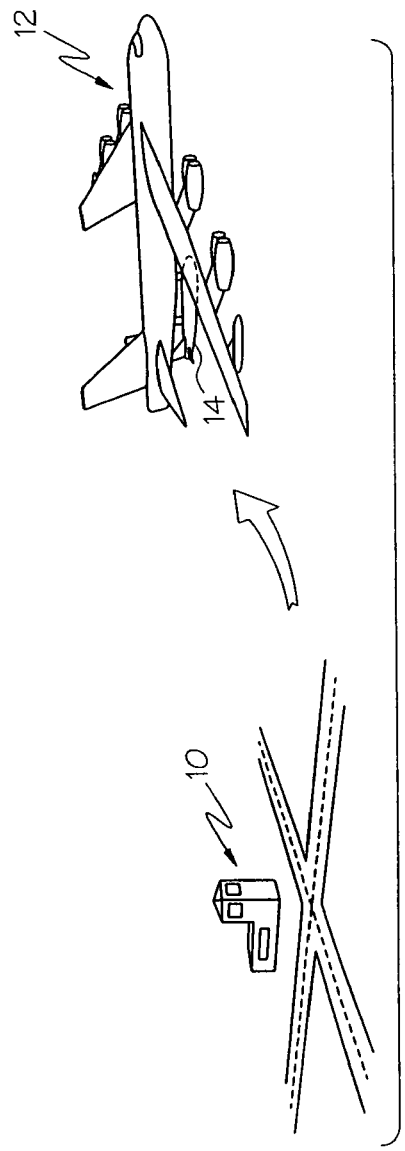
Figure 1C:
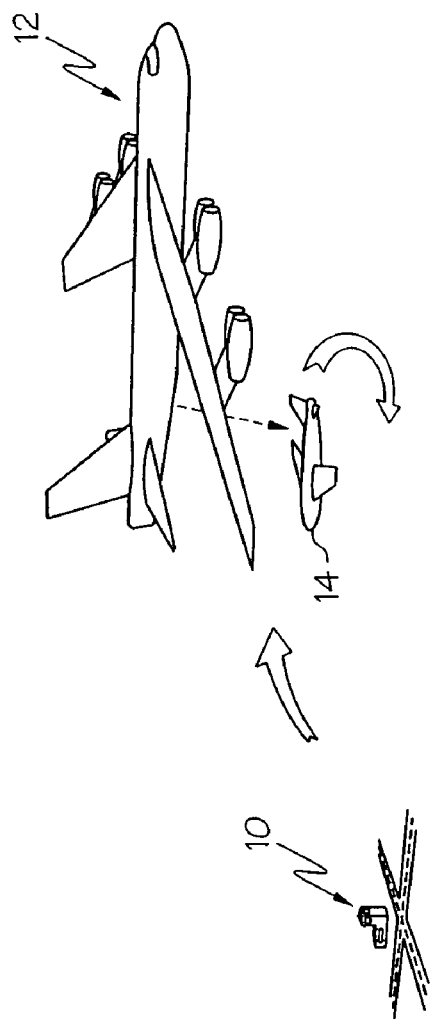
Figure 2A:
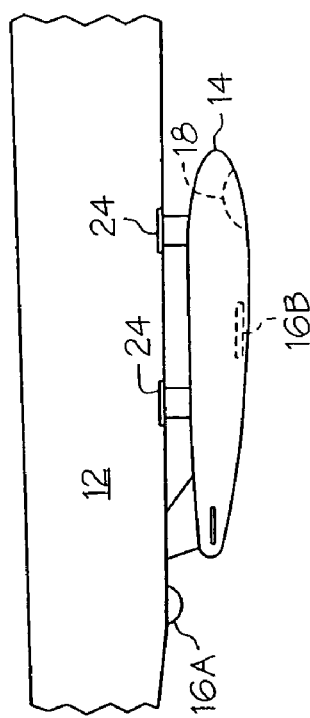
FIGS. 2A–2C are close-up sequential diagrams illustrating separation of the countermeasure module from the aircraft, deployment of flight means on the countermeasure module, and flight of the countermeasure module back to a desired location, in accordance with the present invention.
Figure 2B:
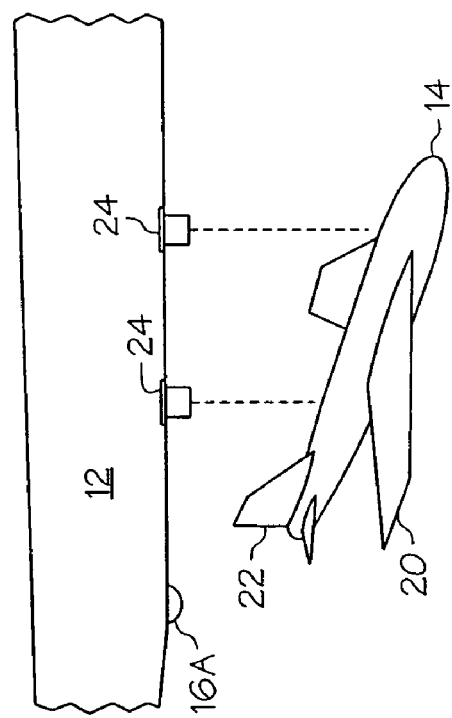

With reference to FIG. 1B, and the close-up view of FIG. 2A, when the aircraft 12, including the countermeasure module 14, becomes airborne, the missile warning system 16A, 16B is active and scans for missile launch signatures. Assuming that a missile launch is detected, the countermeasure equipment 18 is activated, in an attempt to jam or redirect the missile threat. At this time, the countermeasure module is attached to the aircraft, and at least a portion of the countermeasure equipment 18 is contained in the countermeasure module 14. A release mechanism 24 mechanically couples, and, if needed, electrically couples, the countermeasure module 14 to the aircraft. The release mechanism 24 is preferably of a standardized configuration, such that a variety of countermeasure equipment modules are made to be compatible with a variety of aircraft. Standard lugs, fly-away lugs, and folding lugs that are hook-and-clasp designs commonly used for bombs are examples of suitable releasable coupling mechanisms for release mechanism 24 of the countermeasure module 14. T-slots, often used for missiles, are also applicable for this purpose. In addition, a mortise and tenon connection, one or more solenoid pins, or a magnetic locking apparatus may be used. Releasable electrical connections, such as a slide mechanism that has a metal-to-metal coupling are appropriate for releasable electrical coupling between the aircraft and the countermeasure module With reference to FIG. 1C, and the close-up view of FIG. 2B, when the aircraft 12, including the countermeasure module 14 reaches a safe altitude, such as an altitude that is out of the range of MANPAD missile systems, or another designated position, in one embodiment, the countermeasure module 14 is released from the aircraft 12. At this time, the release mechanism initiates the detachment of the countermeasure module 14 from the aircraft 12.

Prior to, at the time of, or following, jettison of the countermeasure module 14 from the aircraft 12, flight systems are deployed on the countermeasure module 14 such that the module is capable of taking flight. In this example, wings 20 and a tail 22 are deployed on the module 14, for example from a tucked position to an open position. In this manner, the countermeasure module 14 is operable as an unmanned air vehicle (UAV) capable of flight to a desired destination.

Figure 1D:
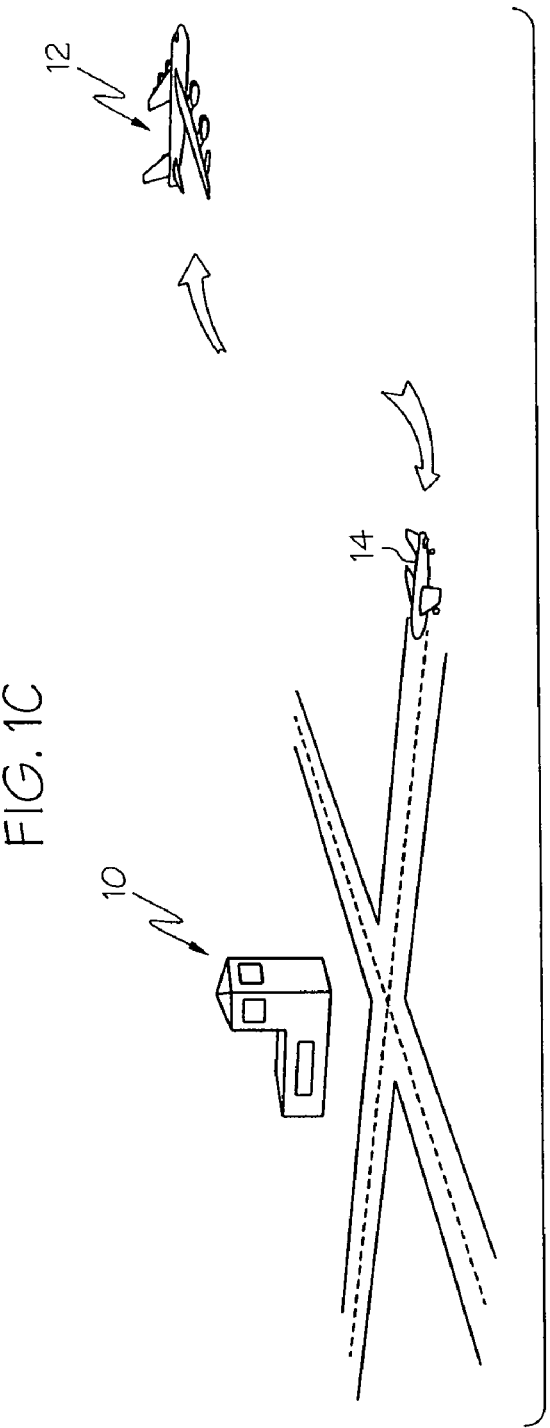
Figure 2C:
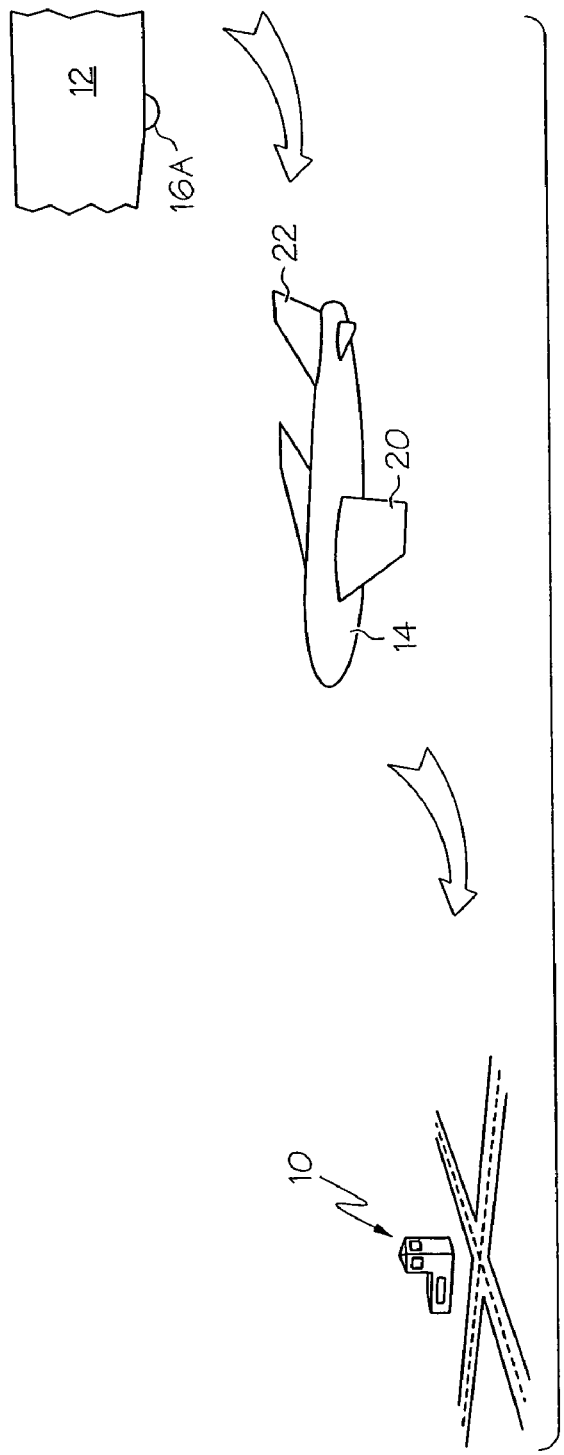

With reference to FIG. 1D, and the close-up view of FIG. 2C, the countermeasure module 14, upon being fully disengaged from the aircraft 12, takes flight and initiates a return to a designated location. When in flight, the countermeasure module 14 may include autonomous flight controls for directing the module 14 back to a specified location, such as the airport 10 from which it was sent, or from another nearby landing strip designed specifically for landing of the modules. Alternatively, the countermeasure module 14 may include communication systems for receiving external communication signals from an operator in a control tower responsible for guiding and landing the countermeasure module 14.

The countermeasure module 14 may include propulsion systems for powering the unit back to its designated destination. Alternatively, the module 14 may be operable as a glider having no independent propulsion capability. The module 14 may also be returned to the ground by parachute, for example by a guided parachute system that is capable of directional flight.

Figure 3:
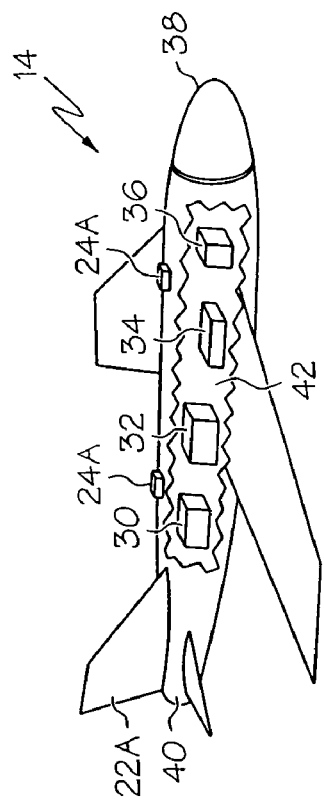
FIG. 3 is a cutaway conceptual view of the countermeasure module, in accordance with the present invention.

FIG. 3 is a cutaway conceptual view of the countermeasure module 14. The body of the module is preferably rigid and lightweight in structure and includes a cavity 42 for housing the countermeasure equipment. The exterior of the body 40 is preferably aerodynamic in shape to reduce drag both while mounted to the aircraft, and while returning to the desired location. The body may be shaped to include a stabilizing tail 22, and wings 20 (see FIG. 2B) that can optionally be retracted to reduce drag while the module 14 is mounted to the aircraft 12, and to deploy upon separation from the aircraft. In an alternative embodiment, the wings of the countermeasure module may comprise permanent structures that do not retract.

The countermeasure equipment includes, for example, a power system 30 for supplying power to the equipment, a processor 32, an energy source 34 such as a flashlamp or laser, opto-electronics 36 for modulating the emitted energy, interrogating the incoming missile sensors, and guiding the emitted energy through a dome 38 that is transparent to the emitted energy. An optional propulsion system and/or communication system may also be included as described above.

While this invention has been particularly shown and described with references to preferred embodiments thereof, it will be understood by those skilled in the art that various changes in form and details may be made herein without departing from the spirit and scope of the invention as defined by the appended claims.

I claim:

1. An attack countermeasure system for an aircraft comprising:
   a countermeasure module including a chamber;
   countermeasure equipment housed in the chamber of the countermeasure module;
   an attachment mechanism for releasable attachment of the countermeasure module to an aircraft; and
   a flight mechanism on the countermeasure module for returning the countermeasure module to a location, such that when an aircraft to which the countermeasure module is attached reaches a desired airborne position, the attachment mechanism releases the countermeasure module from the aircraft, and the flight mechanism on the released countermeasure module returns the countermeasure module to the location.

2. The system of claim 1 wherein the countermeasure module is aerodynamic in shape.

3. The system of claim 1 wherein the countermeasure module is in the shape of a pod.

4. The system of claim 1 wherein the countermeasure equipment comprises one or more passive countermeasures selected from the group consisting of flares and chaff.

5. The system of claim 1 wherein the countermeasure equipment comprises one or more active countermeasures.

6. The system of claim 1 wherein the countermeasure equipment comprises one or more countermeasure electronics.

7. The system of claim 6 wherein the one or more countermeasure electronics comprise flashlamp-based countermeasure electronics.

8. The system of claim 6 wherein the one or more countermeasure electronics comprise laser-based countermeasure electronics.

9. The system of claim 8 wherein the laser-based countermeasure electronics are selected from the group consisting of closed-loop infrared countermeasure (CLIRCM) systems, open loop systems, and high-power laser systems.

10. The system of claim 1 wherein the attachment mechanism comprises a mechanism selected from the group consisting of: a mortise and tenon connection, one or more solenoid pins, a magnetic locking mechanism, lugs, fly-away lugs, folding lugs, and T-slot mechanisms.

11. The system of claim 1 wherein the flight mechanism comprises wings that are deployed from the countermeasure module.

12. The system of claim 1 wherein the flight mechanism includes a propulsion system.

13. The system of claim 1 wherein the airborne position comprises a desired altitude.

14. The system of claim 1 wherein the location is a ground location.

15. The system of claim 1 wherein the location is an airport landing strip.

16. A method of protecting an aircraft from surface-to-air missiles comprising:
    mounting a countermeasure module including countermeasure equipment to an aircraft;
    upon the aircraft becoming airborne and reaching a desired airborne position, releasing the countermeasure module from the aircraft; and
    returning the countermeasure module to a desired location.

17. The method of claim 16 further comprising the countermeasure equipment performing countermeasure activity against incoming surface-to-air missiles for the aircraft while the countermeasure module is mounted to the airborne aircraft.

18. The method of claim 16 wherein mounting comprises mounting countermeasure equipment comprising one or more passive countermeasures selected from the group consisting of flares and chaff.

19. The method of claim 16 wherein mounting comprises mounting countermeasure equipment comprising one or more active countermeasures.

20. The method of claim 16 wherein mounting comprises mounting countermeasure equipment comprising one or more countermeasure electronics.

21. The method of claim 20 wherein the one or more countermeasure electronics comprise flashlamp-based countermeasure electronics.

22. The method of claim 21 wherein the laser-based countermeasure electronics are selected from the group consisting of closed-loop infrared countermeasure (CLIRCM) systems, open loop systems, and high-power laser systems.

23. The method of claim 20 wherein the one or more countermeasure electronics comprise laser-based countermeasure electronics.

24. The method of claim 16 wherein returning the countermeasure module comprises deploying wings on the countermeasure module.

25. The method of claim 16 wherein returning the countermeasure module comprises deploying a propulsion system on the countermeasure module.

26. The method of claim 16 wherein reaching a desired position comprises reaching a desired altitude.

27. The method of claim 16 wherein returning the countermeasure module to a desired location comprises returning the countermeasure module to a ground location.

28. The method of claim 16 wherein returning the countermeasure module to a desired location comprises returning the countermeasure module to an airport landing strip.

* * * * *

UNITED STATES PATENT AND TRADEMARK OFFICE
CERTIFICATE OF CORRECTION

PATENT NO. : 7,053,812 B2 Page 1 of 1
APPLICATION NO. : 10/739866
DATED : May 30, 2006
INVENTOR(S) : Daniel W. Trainor It is certified that error appears in the above-identified patent and that said Letters Patent is hereby corrected as shown below:

In Column 7, Claim 22, Line 17, delete "21" and insert --23--.

Signed and Sealed this

Thirty-first Day of October, 2006

JON W. DUDAS
*Director of the United States Patent and Trademark Office*